(12) United States Patent
Tran et al.

(10) Patent No.: US 8,649,437 B2
(45) Date of Patent: Feb. 11, 2014

(54) IMAGE INTERPOLATION WITH HALO REDUCTION

(75) Inventors: Thuy-Ha Thi Tran, Hue (VN); Chon Tam Ledinh, Montreal (CA)

(73) Assignee: QUALCOMM Incorporated, San Diego, CA (US)

( * ) Notice: Subject to any disclaimer, the term of this patent is extended or adjusted under 35 U.S.C. 154(b) by 670 days.

(21) Appl. No.: 12/338,954

(22) Filed: Dec. 18, 2008

(65) Prior Publication Data

US 2009/0161010 A1 Jun. 25, 2009

Related U.S. Application Data

(60) Provisional application No. 61/015,228, filed on Dec. 20, 2007, provisional application No. 61/015,970, filed on Dec. 21, 2007.

(51) Int. Cl.
*H04B 1/66* (2006.01)
*H04N 7/12* (2006.01)
*H04N 11/02* (2006.01)
*H04N 11/04* (2006.01)

(52) U.S. Cl.
USPC .................. 375/240.16; 375/240.12

(58) Field of Classification Search
USPC ..................................... 375/240.16
See application file for complete search history.

(56) References Cited

U.S. PATENT DOCUMENTS

| | | | |
|---|---|---|---|
| 5,057,921 A | 10/1991 | Robert et al. | |
| 5,610,658 A | 3/1997 | Uchida et al. | |
| 5,754,237 A | 5/1998 | Jung | |
| 6,005,639 A | 12/1999 | Thomas et al. | |
| 6,011,596 A | 1/2000 | Burl et al. | |
| 6,130,912 A | 10/2000 | Chang et al. | |
| 6,160,850 A | 12/2000 | Chen et al. | |
| 6,219,436 B1 | 4/2001 | De Haan et al. | |
| 6,222,882 B1 | 4/2001 | Lee et al. | |
| 6,263,089 B1 | 7/2001 | Otsuka et al. | |
| 6,487,313 B1 | 11/2002 | De Haan et al. | |
| 6,625,333 B1 | 9/2003 | Wang et al. | |
| 6,876,703 B2 | 4/2005 | Ismaeil et al. | |

(Continued)

FOREIGN PATENT DOCUMENTS

| EP | 0647919 A1 | 4/1995 |
|---|---|---|
| EP | 1 587 032 A1 | 10/2005 |

(Continued)

OTHER PUBLICATIONS

Chen, Tao, "Adaptive Temporal Interpolation Using Bidirectional Motion Estimation and Compensation", IEEE ICIP 2002, vol. 2, Sep. 22, 2002, pp. 313-316.

(Continued)

*Primary Examiner* — Tung Vo
*Assistant Examiner* — Kristin Dobbs
(74) *Attorney, Agent, or Firm* — Haynes and Boone, LLP

(57) ABSTRACT

An image interpolator is presented that utilizes a block-based motion estimator to provide block-based motion vectors and a motion vector select coupled to the block-based motion estimator to provide pixel based motion vectors. A first image interpolator provides a first interpolated image from the selected motion vectors. A second image interpolator corrects the selected motion vectors, including a correction for halo reduction. Post processing can be utilized to further reduce the halo effect.

27 Claims, 7 Drawing Sheets

(56) References Cited

U.S. PATENT DOCUMENTS

| | | |
|---|---|---|
| 6,914,938 B2 | 7/2005 | Zhang et al. |
| 7,010,039 B2 | 3/2006 | De Haan et al. |
| 7,039,109 B2 | 5/2006 | Pelagotti et al. |
| 7,058,227 B2 | 6/2006 | De Haan et al. |
| 7,489,821 B2 | 2/2009 | Fisher et al. |
| 7,933,769 B2 | 4/2011 | Bessette |
| 8,064,522 B2 | 11/2011 | Kondo et al. |
| 8,130,845 B2 | 3/2012 | Brusnitsyn et al. |
| 2003/0072373 A1 | 4/2003 | Sun |
| 2004/0057517 A1 | 3/2004 | Wells |
| 2004/0091170 A1 | 5/2004 | Cornog et al. |
| 2004/0246374 A1* | 12/2004 | Mishima et al. ............ 348/441 |
| 2005/0025342 A1 | 2/2005 | Lee et al. |
| 2005/0135482 A1 | 6/2005 | Nair et al. |
| 2005/0135485 A1 | 6/2005 | Nair et al. |
| 2005/0265451 A1 | 12/2005 | Shi et al. |
| 2006/0072790 A1 | 4/2006 | Wittebrood et al. |
| 2006/0136402 A1 | 6/2006 | Lee |
| 2007/0036213 A1* | 2/2007 | Matsumura et al. ..... 375/240.03 |
| 2007/0121725 A1 | 5/2007 | Li |
| 2007/0291843 A1 | 12/2007 | Chappalli et al. |
| 2008/0074350 A1 | 3/2008 | Beon et al. |
| 2008/0084934 A1 | 4/2008 | Agrawal |
| 2008/0137747 A1 | 6/2008 | Yamasaki et al. |
| 2008/0159630 A1 | 7/2008 | Sharon et al. |
| 2008/0181306 A1 | 7/2008 | Kim et al. |
| 2008/0204592 A1* | 8/2008 | Jia et al. ................ 348/402.1 |
| 2008/0247461 A1 | 10/2008 | Nishida |
| 2008/0285650 A1 | 11/2008 | Chappalli |
| 2008/0317129 A1 | 12/2008 | Lertrattanapanich et al. |
| 2009/0087120 A1* | 4/2009 | Wei ............................ 382/266 |
| 2009/0135913 A1* | 5/2009 | Nair et al. ............... 375/240.16 |
| 2009/0161763 A1 | 6/2009 | Rossignol et al. |
| 2009/0316784 A1 | 12/2009 | Kervec et al. |
| 2010/0128126 A1 | 5/2010 | Takeuchi |
| 2010/0245670 A1 | 9/2010 | Takeda et al. |
| 2010/0253835 A1 | 10/2010 | Zhou et al. |
| 2010/0290532 A1 | 11/2010 | Yamamoto et al. |
| 2010/0329344 A1 | 12/2010 | Hayase et al. |
| 2011/0216240 A1 | 9/2011 | Ohno |
| 2011/0216831 A1 | 9/2011 | Rossignol et al. |
| 2011/0249870 A1 | 10/2011 | Cheng et al. |
| 2011/0255004 A1 | 10/2011 | Tran et al. |
| 2013/0121419 A1 | 5/2013 | Le et al. |

FOREIGN PATENT DOCUMENTS

| | | | |
|---|---|---|---|
| EP | 1 855 474 A1 | | 11/2007 |
| EP | 1885132 A2 | | 2/2008 |
| EP | 1885129 A3 | | 7/2008 |
| GB | 2279531 A | * | 1/1995 |
| JP | H05507826 A | | 11/1993 |
| JP | 7177501 A | | 7/1995 |
| JP | 7203462 A | | 8/1995 |
| JP | 8265777 A | | 10/1996 |
| JP | 9233435 A | | 9/1997 |
| JP | 10134193 A | | 5/1998 |
| JP | 10304371 A | | 11/1998 |
| JP | 2003078807 A | | 3/2003 |
| JP | 2004516724 A | | 6/2004 |
| JP | 2004320279 A | | 11/2004 |
| JP | 2005056410 A | | 3/2005 |
| JP | 2005191968 A | | 7/2005 |
| JP | 2005191969 A | | 7/2005 |
| WO | WO 91/20155 | | 12/1991 |
| WO | WO 02/49365 | | 6/2002 |

OTHER PUBLICATIONS

Choi, Byeong-Doo, et al., "Motion-Compensated Frame Interpolation Using Bilateral Motion Estimation and Adaptive Overlapped Block Motion Compensation", IEEE Transactions on Circuits and Systems for Video Technology, vol. 17, No. 4, Apr. 2007, pp. 407-416.

Kang, Suk Ju, et al., "Frame Rate Up-Conversion with Bidirectional Sub-Sampled Block Motion Estimation and Minimum Deviation Filter", International Conference on New Exploratory Technologies, Oct. 25, 2007.

PCT International Search Report and the Written Opinion dated Apr. 16, 2009, in related International Application No. PCT/US2008/013887.

International Preliminary Report on Patentability mailed Jul. 1, 2010, in related International Application No. PCT/US2008/013887.

G. De Haan, "IC for Motion-Compensated De-Interlacing, Noise Reduction and Picture Rate Conversion", IEEE Trans. On CE, vol. 45, No. 3, Aug. 1999.

K. Sugiyama et al, "Motion Compensated Frame Rate Conversion Using Normarized Motion Estimation", 2005 IEEE Workshop on Signal Processing Systems—Design and Implementation (SiPS 2005), Athens, Greece, 2005.

Jeon, et al., "Coarse-to-Fine Frame Interpolation for Frame Rate Up-Conversion Using Pyramid Structure", IEEE Transactions on Consumer Electronics, vol. 49, No. 3, Aug. 2003, pp. 499-508.

Jozawa et al: "Two-Stage Motion Compensation Using Adaptive Global MC and Local Affine MC" IEEE Transactions on Circuits and Systems for Video Technology, IEEE Service Center, Piscatway, NJ, US, vol. 7, No. 1, (Feb. 1, 1997).

Lee, et al., "Hierarchical Motion-Compensated Frame Interpolation Based on the Pryramid Structure", Y. Zhuang et al. (Eds.): PCM 2006, LNCS 4261, 2006, pp. 211-220, ©Springer-Verlag, Berlin Heidelberg.

R. Thoma et al.: "Motion compensating interpolation considering covered and uncovered background", Signal Processing: Image Compression 1, pp. 191-212, 1989.

Robert P et al., "Advanced high definition 50 to 60 Hz standard conversion", Broadcasting Convention, 1988. IBC 1988. International Brighton, UK, London, UK, IEEE, UK, Jan. 1, 1988, pp. 21-24, XP006518347, ISBN: 978-0-85296-368-5.

* cited by examiner

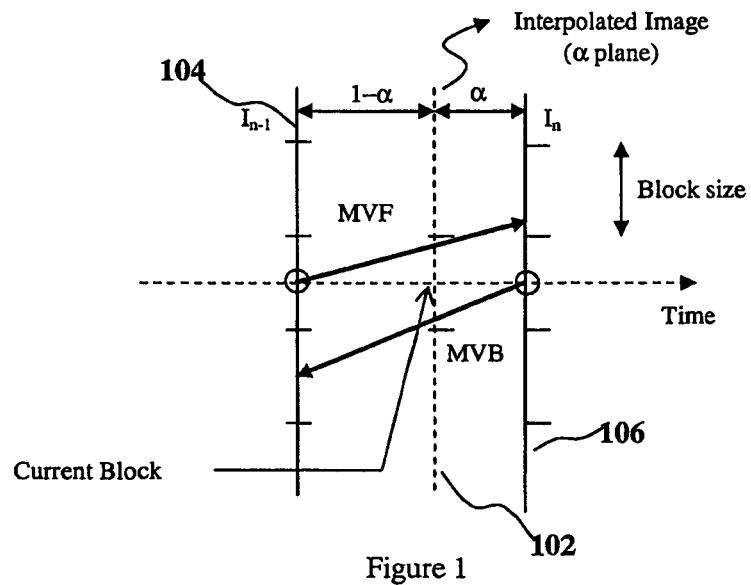
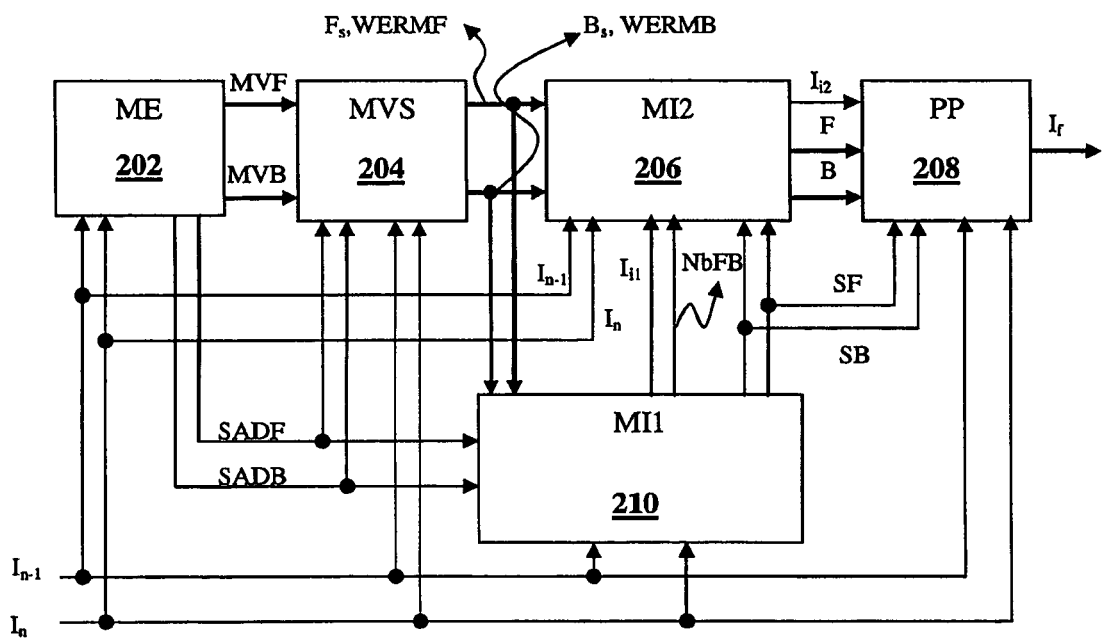

IMAGE INTERPOLATION WITH HALO REDUCTION

RELATED APPLICATIONS

This application claims priority to U.S. Provisional Application Ser. No. 61/015,228, filed on Dec. 20, 2007, and to U.S. Provisional Application Ser. No. 61/015,970, filed on Dec. 21, 2007, both of which are herein incorporated by reference in their entirety.

BACKGROUND

1. Field of the Invention

The present invention relates to reduction of motion compensation artifacts in an image interpolation more specifically to halo reduction in interpolated images.

2. Discussion of Related Art

Image interpolation based on motion compensation is a well-established technique. One example of motion compensation is frame-rate conversion (FRC), which is often utilized to increase (or decrease) the refresh rate in video and to have more images (or fewer images) shown per second. One advantage of interpolating video to a higher number of images per second is that, with the higher refresh rates available in LCD panels, motion appears more fluid. Another advantage is in the conversion of film content, which is normally at 24 frames per second (fps), to video, which could be 30, 50, 60, 100, 120, 200 or 240 fps. An advantage of interpolating to fewer images is in conversion between commonly used standards such as 60 Hz for National Television System Committee (NTSC) to 50 fps for the Phase Altering Line (PAL) standard.

FRC is very challenging, particularly in real-time video. Many previous solutions have attempted to address this issue; however, these solutions all introduce artifacts, especially in real-time applications. Most prior art methods use block-based motion vector (MV) estimation for motion compensation (MC) and motion estimation (ME). These prior art solutions, even for progressive images, cause many artifacts, including the halo effect, flickering, and block artifacts.

Block artifacts can occur when the MV estimation is based on a block of pixels of fixed and predetermined size. In this case, all pixels in a block are supposed to have the same MV even if within a block there are different objects or regions moving in different manners. Moreover, when adjacent blocks to a given block have different estimated motion vectors for any reason, the block boundaries become more obvious as same-region pixels will be displaced differently in different adjacent blocks.

Flickering is another artifact in motion compensated image interpolation. This artifact occurs when the motion vectors of a few pixels in the image sequence are not consistent from one frame to another frame. The inconsistency is generally due to erroneous motion vector calculations in a small region.

Halo effects occur around a foreground object in an image in a video sequence when the object is moving relative to a background. The background could be stationary and the object moving or vice versa. In some cases, both the object and the background are moving, as may be the case, for example, in a video game sequence. The origin of the halo effect is erroneous MV estimation in occlusion areas. The visual perception of the halo effect is that objects seem to have a halo of different characteristic around them. For example, the face of a person walking in a scene could seem to be surrounded by a halo, as if a portion of the background was moving along with the face.

There have been various halo reduction algorithms developed. Halo reduction can be based on Object-based Interpolation as described in U.S. Pat. No. 6,625,333. However, this technique implies object segmentation and object coloring, which requires additional frame memory and additional bandwidth. Moreover, the proposed MV correction requires multiple frame-based iterations which are not suitable for real-time processing.

Multi-frame solutions, those that involve analysis of more than two frames of data, have also been proposed. See, e.g., U.S. Pat. No. 6,005,639; U.S. Pat. No. 6,011,596; U.S. Pat. No. 7,010,039; U.S. Application Publication No. 2007/0121725A1; and K. Sugiyama, T. Aoki & S. Hangai, "*Motion Compensated Frame Rate Conversion Using Normalized Motion Estimation*", 2005 IEEE Workshop on Signal Processing Systems—Design and Implementation (SiPS 2005), Athens, Greece. Multi frame solutions for covering/uncovering/no occlusion detection and MV correction are based essentially from previous-previous and far-future images frames. Multi-frame solutions require large image memory and highly increased bandwidth between the memory and the processor.

Two-frame solutions that have been proposed are based on MV correction (or re-estimation), Interpolation strategies, and/or a mixing of these two methods. In MV correction, separating foreground and background motion vectors is also a possible way to reduce the halo effects. The use of some motion vectors set at borders of the image as possible background MV has been proposed in U.S. Publication No. US 2006/0072790 A1. The assumption that the border MV is the background MV, however, is not necessarily valid and the background MV estimation requires additional frame latency and extra memory.

Median Filtering, an example of interpolation strategy, is proposed in G. de Haan, "*IC for Motion-Compensated De-Interlacing, Noise Reduction and Picture Rate Conversion*", IEEE Trans. on CE, Vol. 45, No. 3, August 1999. In this reference, Median Filtering Interpolation is the median value of forward image interpolation, backward image interpolation, and the averaging value of the two existing images. Moreover, forward and backward MV are obtained using a single recursively estimated MV. Median Filtering Interpolation, as described, can yield generally good results in no-occlusion regions. However, in occlusion regions the estimated MV utilizing the Median Filtering method is no longer correct.

A weighted mean of individual interpolations is proposed in U.S. Pat. No. 7,039,109. Each individual interpolation provided by the MV in a neighbor group is based again on Median Filtering of forward and backward interpolations and the mean value of the two existing images. MVs described in this patent are block-based and forward estimated from the present image to the next image. The weight specified for an individual interpolation is a measure of reliability in function of the difference of a predicted luminous intensity and/or of the relative frequency of occurrence of the MV in the neighboring groups. MV edge detection is also provided for complexity reduction purposes. However, the group or block-based MV solution can provide blocking effects. Additionally, a single (forward) MV for a block can be insufficient in occlusion parts of the picture. Further, MV edge detection is only good for software simulation. Also, pixel-based image averaging can blur the interpolated image in the occlusion regions or yield an image doubling effect when the MV is large.

Covering/Uncovering Detection, a second block-based ME with error at $2^{nd}$ or $4^{th}$ power, is proposed for more precision in U.S. Pat. No. 6,219,436. MV Correction by using MV at shifted locations in the function of detected "real" covering uncovering regions is proposed. However, various median filtering strategies with appropriate mean values for detected regions are in fact the preferable solution presented in the patent.

In both U.S. Pat. No. 6,487,313 and U.S. Pat. No. 7,058,227, it is assumed that the discontinuities in MV field correspond to the borders of moving objects. The use of MV length to determine the occlusion areas, an additional bidirectional interpolation error calculation with small block size for increasing the precision of detected occlusion areas, and various median filtering for final interpolation is thus proposed. However, MV length is not necessarily a reliable parameter when the objects are composed of flat but noisy regions. The discontinuities in MV field and borders of moving objects require some expensive precision, and median filtering is still an ad-hoc technique since MV is not corrected.

Therefore, there is a need to provide a fast interpolation of image planes that does not require large amounts of memory to accomplish.

SUMMARY

An image interpolator that is consistent with embodiments of the present invention can include a motion estimator that estimates block-based motion vectors between a first image and a second image; a motion vector select coupled to the motion estimator that provides selected motion vectors based on the block-based motion vectors; a first interpolator coupled to receive the selected motion vectors and provide a first interpolated image for a plane between the first image and the second image; and a second interpolator coupled to receive the first interpolated image that corrects the selected motion vectors to form corrected motion vectors and provides a second interpolated image based on corrected motion vectors.

Another image interpolator that is consistent with the present invention may include a block-based motion estimator coupled to receive adjacent images, the block-based motion estimator providing a block-based motion vector, a block-based motion vector, a forward error, and a backward error; a motion vector select coupled to the block-based motion estimator, the motion vector select providing pixel based selected forward motion vector and selected backward motion vector, and providing pixel based forward and backward errors; a first image interpolator coupled to the block-based motion estimator and the motion vector select, the first image interpolator providing a first interpolated image from the selected forward motion vector and the selected backward motion vector; a second image interpolator coupled to the first image interpolator and the motion vector select, the second image interpolator providing a second interpolated image and corrected forward motion vectors and corrected backward motion vectors; and a post processing block coupled to the first image interpolator and the second image interpolator, the post processing block providing a final interpolated image from the second interpolated image and the corrected forward motion vectors and the corrected backward motion vectors.

A method for interpolating an image between first and second adjacent images consistent with embodiments of the present invention includes estimating a block-based forward motion vector and a block-based backward motion vector between the first and second adjacent images; selecting a forward motion vector for each pixel in the image based on the block-based forward motion vector and a forward error function; selecting a backward motion vector for each pixel in the image based on the block-based backward motion vector and a backward error function; interpolating a first image from the selected backward motion vectors, the selected forward motion vectors, a block-based forward estimation error, and a block-based backward estimation error; interpolating a second image from the first image based on forward and backward weighted errors of the selected forward motion vector and the selected backward motion vector; and determining the image from the second image.

These and other embodiments consistent with the invention are further described below with reference to the following figures.

BRIEF DESCRIPTION OF THE DRAWINGS

FIG. 1 illustrates interpolation of an image plane between two adjacent images.

FIG. 2 shows a block diagram of an embodiment of an image interpolator consistent with the present invention.

Figure 3:
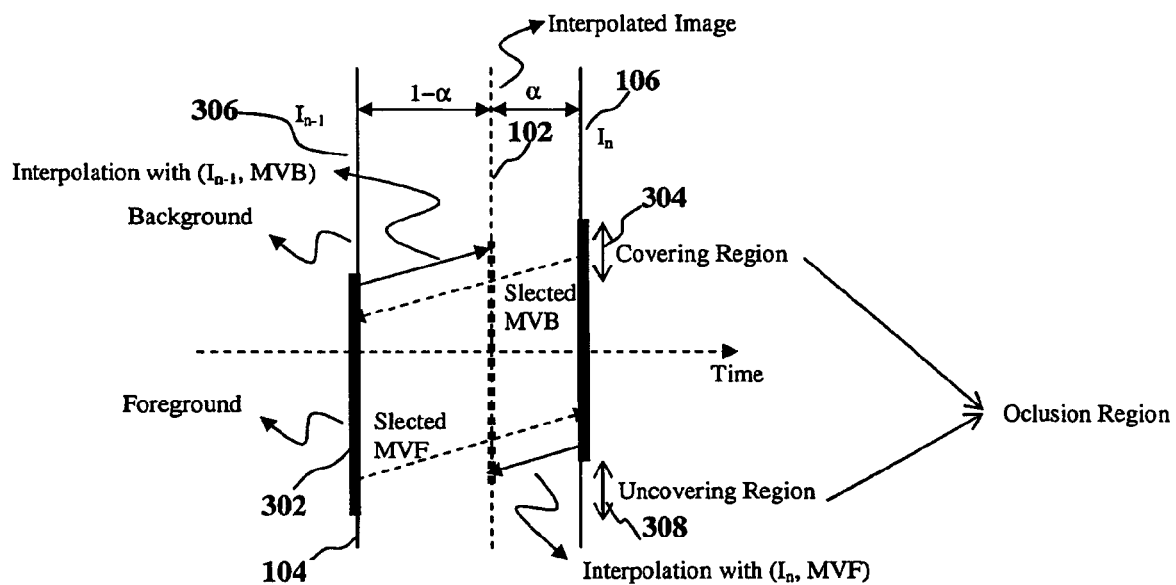
FIG. 3 illustrates foreground and background and covering and uncovering regions utilized in some embodiments consistent with the present invention.

In the figures, to the extent possible, elements having the same or similar functions have the same designations.

DETAILED DESCRIPTION

In a frame rate conversion (FRC) application, the "Halo Effect" is a visual artifact that occurs when a foreground object is moving against a detailed background. A system for reducing the Halo Effect consistently with the present invention includes a pixel-based motion vector (MV) selection, a preliminary interpolation, local shape adaptive windowing for MV foreground/background correction, and a final interpolation with some additional post-processing. The preliminary and final image interpolations are based on occurrence frequency of local Sum of Absolute Differences (SADs) of the forward and backward motion vector estimations. The MV correction for halo reduction can then be based substantially on local image intensities and on local MV variations. Some embodiments are non-iterative techniques that are efficient for image memory usage and communication bandwidth between the image memory and the image processor.

FIG. 1 illustrates the time position of an interpolated image ($\alpha$-plane) 102 to be interpolated from two consecutive images 104 and 106. Contrary to proposed multi-frame solutions (See U.S. Pat. No. 6,005,639; U.S. Pat. No. 6,011,596; U.S. Pat. No. 7,010,039; U.S. Publication No. 2007/0121725A1, and K. Sugiyama, T. Aoki & S. Hangai, "*Motion Compensated Frame Rate Conversion Using Normalized Motion Esti-* mation"), interpolated image 102 is based on information from only two consecutive images, image 104 $I_n$ and image 106 $I_{n-1}$. Images 104 and 106 are used to interpolate image 102 at an arbitrary temporal distance referred to as the "Alpha (α) plane", located a distance α in time from image 104 $I_n$ and a distance (1−α) from image 106 $I_{n-1}$, as shown in FIG. 1. Because only two existing images are used for the interpolation, some embodiments consistent with the present invention are advantageous in terms of memory, bandwidth, and speed. Some embodiments of the present invention yield visually desirable interpolated images and provide acceptable real-time FRC solutions.

FIG. 2 illustrates an embodiment of an image interpolator 200 consistent with the present invention. Data representing images 104 and 106, $I_{n-1}$ and $I_n$, are input to image interpolator 200. An interpolated image, $I_f$, corresponding to the image in α-plane 102, is output from image interpolator 200. Image interpolator 200 includes a motion estimator (ME) 202, a motion vector selector (MVS) 204, a first motion interpolator (MI1) 210, a second motion interpolator (MI2) 206, and a post processing (PP) block 208. The image inputs $I_{n-1}$ and $I_n$ are received by each of ME 202, MVS 204, MI1, 210, MI2 206, and PP 208.

Motion Estimator 202 analyzes image data $I_n$ and $I_{n-1}$ and provides forward motion vectors (MVF) and backward motion vectors (MVB), as shown in FIG. 1 for a single block. ME 202 may be a block matching algorithm used to estimate forward motion vector MVF and backward motion vector MVB. Forward motion vector (MVF) indicates the displacement of a given image block in image 104, $I_{n-1}$, with respect to a matched block in image 106, $I_n$. Backward motion vector (MVB) indicates the displacement of a given block in image 106, $I_n$, with respect to a matched block in image 104, $I_{n-1}$. In addition, ME 202 generates a forward and backward Sum of Absolute Differences Errors SADF and SADB for the full search estimated to produce MVF and MVB, respectively. Mathematically, SADF, SADB, MVF, and MVB can be defined as follows:

$$SADF = \min_k \left( \left( \sum_{y \in BW} |I_{n-1}(x+y) - I_n(x+y+k)| \right) / N(BW) \right); \quad (1)$$

$$SADB = \min_k \left( \left( \sum_{y \in BW} |I_{n-1}(x+y+k) - I_n(x+y)| \right) / N(BW) \right);$$

$MVF = k * \text{minimizing} SADF$ in a given search zone; and $MVB = k * \text{minimizing} SADB$ in a given search zone.

In the equations, N(BW) denotes the size of the block BW, x are pixel coordinates of the current block BW and, y are the coordinates of pixels within the current block BW. For precision purposes, the SADF, SADB and the corresponding motion vectors can be associated with a small window block B of pixel size m×n located inside block BW. A block-based MV field is therefore generated as a result for each of the images 104, $I_n$, and 106, $I_{n-1}$. An example of a motion estimator that can be utilized as motion estimator 202 is further described in U.S. patent application Ser. No. 12/338,960, filed on Dec. 18, 2008, now U.S. Pat. No. 8,265,158, which is herein incorporated by reference in its entirety.

In some embodiments, the motion estimation performed in ME 202 can be adaptive for a particular search range, with or without lattice detection or estimation. ME 202 with Lattice detection can also provide a block-based periodic detected signal and a global MV, when it is available.

In embodiments appropriate for interlaced images, the motion estimation performed in ME 202 can be performed directly on adjacent fields with same and/or opposite parity. Alternatively, in some embodiments adapted to minimize eventual aliasing effects, motion estimation can be performed on de-interlaced image versions with suitable filtering and cadence detection.

MV Selector (MVS) 204 converts the MV field (i.e., all the MVFs and MVBs from ME 202) from block-based to pixel-based in the alpha (α) plane of image 102. As such, MVS 204 is coupled to receive the forward and backward motion vectors MVF and MVB and the values SADF and SADB from ME 202 as well as image data $I_{n-1}$ and $I_n$. Conversion from block-based data to pixel-based data, in some embodiments, is effective in reducing the blocking effect. MVS 204 provides each pixel with its own forward MV and its own backward MV and generates two pixel-based MV fields corresponding to forward and backward motion vectors MVS 204 takes the fields MVF and MVB and performs pixel-based motion vector selection for each of MVF and MVB in the α-plane of image 102. For each temporal and spatial pixel position P in the α-plane, a m×n pixel block surrounding pixel position P is considered, where P is significantly central to the m×n block of pixels. Next, areas in both images 104, $I_n$, and 106, $I_{n-1}$, consisting of a number p×q of equivalent blocks of m×n pixels around the positions corresponding to P in images 104 and 106 are examined, which amounts to p×q×m×n block-of-pixels areas. These areas in data $I_n$ of image 104 and data $I_{n-1}$ of image 106 are therefore p×q times larger than the m×n block in the α-plane 102. Two m×n pixel blocks in the two image planes 104, $I_n$, and 106, $I_{n-1}$, which correspond to the spatial position of the current m×n pixel block in α-plane 102, as illustrated by FIG. 1, are significantly central to these larger areas respectively. All the block-based MVFs that are the output from ME 202 and are pointing from plane 104, $I_{n-1}$, to plane 106, $I_n$, plane are examined and the best MVF is identified and selected, as described below. Similarly, the best MVB is found pointing from plane 106, $I_n$, to plane 104, $I_{n-1}$, in the neighborhood defined by the p×q×m×n pixels. These selected MVF and MVB results, $F_s$ and $B_s$, are output from MVS 204.

The horizontal Neighbor Block Number p, for example, could be determined as a function of the horizontal component length of motion vector MVF, the α value, and the horizontal block size m. However, in some embodiments, a fixed square (±2×±2) (p=5 and q=5) of neighbor vectors around pixel x can be considered for all α.

At a considered pixel of coordinates x, for each of 25 MVF candidates, a local error $LERF_{pq}(X)$ can be calculated in a given window w of N(w) pixels as follows. $LERF_{pq}(X)$ can be given by $$LERF_{pq}(x) = \quad (2)$$
$$\sum_{k \in w} |I_n(x+k+\alpha MVF_{pq}) - I_{n-1}(x+k-(1-\alpha)MVF_{pq})| / N(w)$$

Because x, k, and $MVF_{pq}$ are integers and α is fractional, the required values $I_n(x+k+\alpha MVF_{pq})$ and $I_{n-1}(x+k-(1-\alpha)MVF_{pq})$ in Eq. (2) can be obtained by using appropriate spatial interpolation of the two images.

In some embodiments, a composite local error $CERF_{pq}(x)$ defined as below yields better results:

$$CERF_{pq}(x) = a.LERF_{pq}(x) + (1-a)SADF_{pq} \quad (3)$$

in which the parameter a is greater than ½.

In order to protect the smoothness in the MV field, a penalty factor pf and a penalty offset po are introduced in the following weighted local error $WERF_{pq}(x)$:

$$WERF_{pq}(X) = pf.CERF_{pq}(X) + po. \quad (4)$$

In some embodiments, for example, pf can be set to 2 and po can be set to either 1 or 2 when the horizontal or vertical component of the motion vector MVF differs from a corresponding neighbor mean value by a given threshold. Otherwise, pf can be set to 1 and po set to 0. In the presence of lattice at the current pixel location, the threshold value can be set to be smaller.

The selected forward and backward motion vector $F_s$ is the one that minimizes the error function. For example, if the weighted error function is utilized the selected forward motion vector $F_s$ corresponds to the $MvF_{p^*q^*}$ that minimizes $WERF_{pq}(X)$. Moreover, in order to avoid some conflict situations when some $WERF_{pq}(X)$ are equal for some values of p and q, certain block priorities $P_{pq}$ can be defined. The priority can be a function of distance from the central block, which has the highest priority.

The selected backward motion vector $B_s$ can be similarly chosen. The associate local error $LERB_{pq}(x)$, the composite error CERB(x) and the weighted error WERB(x) are given respectively by:

$$LERB_{pq}(x) = \sum_{k \in w} |I_n(x+k-\alpha MVB_{pq}) - I_{n-1}(x+k+(1-\alpha)MVB_{pq})|/N(w) \quad (5)$$

$$CERB_{pq}(x) = a.LERB_{pq}(x) + (1-a)SADB_{pq} \quad (6)$$

$$WERB_{pq}(x) = pf.CERB_{pq}(x) + po \quad (7)$$

Thus, at each pixel x in the α-plane 102, MVS 204 outputs a pair of forward and backward motion vectors $F_s$ and $B_s$ and their respective associate optimum weighted local error WERMF and WERMB. The results of the calculations performed in MVS 204 can then be utilized in First and Second Motion Interpolators, MI1 210 and MI2 206.

In some embodiments, MI1 210 and MI2 206 provide Halo effect reduction and image interpolation. Contrary to solutions previously described (e.g. in U.S. Pat. No. 6,219,436 (which teaches utilization of a second motion estimator) and U.S. Pat. No. 6,487,313 or U.S. Pat. No. 7,058,227 (which teach utilizing a MV length)), the occlusion covering and uncovering regions are not explicitly detected in MI1 210 and MI2 206.

In some embodiments, First Motion Interpolator (MI1) 210 operates "on-the-fly" or in a pipeline. MI1 210 may not utilize the entire interpolated image for processing in MI2 206. MI1 produces a preliminary interpolated image in α-plane 102 from original images 104, $I_n$, and 106, $I_{n-1}$. The preliminary interpolation further performed in MI1 210 may also utilize the selected MVF, $F_s$, selected MVB, $B_s$, local SADF, and local SADB. In principle, one of the selected MVF and MVB is used in the occlusion covering and uncovering areas.

Covering and occluded areas are illustrated in FIG. 3. As shown in FIG. 3 for covering region 304, the intersection of the MVs and α-plane 102 corresponds to background region 306 in $I_{n-1}$, and to foreground region 302 in $I_n$. Accordingly, the selected MVB, $B_s$, and $I_{n-1}$ are used for this region. This procedure can minimize the probability of the selected MVF $F_s$ pointing from a background object to a foreground object and vice versa, as shown in FIG. 3. Similarly, for uncovering regions 308, the selected MVF, $F_s$, and $I_n$ are used. However, in the occlusion regions which is the union of covering and uncovering regions 304 and 308, neither motion vectors $F_s$ or $B_s$ are valid. Moreover, in order to provide more robustness, a context-based interpolation can be used by combining ($I_n$, $F_s$) and ($I_{n-1}$, $B_s$). The context is based on the pixel number NbFB in a M×N sized sliding window, NbFB is, in turn, the number of pixels which should to be interpolated with $B_s$, the selected MVB.

Let SF and SB be pixel-based values of SADF and SADB, respectively. Further, let S1 and S2 be appropriate threshold values. The value for the number of pixels NbFB can be defined as a number of pixels in the sliding window M×N such that:

If α is greater than or equal to ½, then $$NbFB = \#\_of\_pixels:(SB<S1) \text{ or } [(SB \geq S1) \& (SB \leq SF+S2)] \quad (8)$$

In other words, NbFB is the number of pixels such that their SB is smaller than the threshold S1 or their SB is greater or equal to the threshold S1 and smaller than the sum of their SF and a second threshold value S2.

If α is smaller than ½, then $$NbFB = (M \times N) - \#\_of\_pixels:(SF<S1) \text{ or } [(SF \geq S1) \& (SF \leq SB+S2)] \quad (9)$$

In other words, NbFB is now the complement of the number of pixels such that their SF is smaller than the threshold S1 or their SF is greater or equal to the threshold S1 but smaller than the sum of their SF and a second threshold value S2. S1 and S2 can be set equal respectively 5 and 1.

Let EF be the value of NbFB normalized by the window size and EB the corresponding complementary value. In some embodiments, MI1 210 can then perform the context based interpolation.

$$I_{i1}(x) = EB.I_n(x+\alpha F_s) + EF.I_{n-1}(x+(1-\alpha)B_s) \quad (10)$$

In some embodiments, instead of the interpolation described in Eq. 10, MI1 210 can form an interpolation that is a function of temporal distance a such as the following:

$$I_{i1}(x) = EB.I_{n-1}(x-(1-\alpha)F_s) + EF.I_{n-1}(x+(1-\alpha)B_s), \text{ if } 1 > \alpha \geq ¾;$$

$$I_{i1}(x) = EB.I_n(x+\alpha F_s) + EF.I_n(x-\alpha B_s), \text{ if } ¼ \geq \alpha > 0;$$

$$I_{i1}(x) = EB.I_n(x+\alpha F_s) + EF.I_{n-1}(x+(1-\alpha)B_s), \text{ if } ¾ > 0 > ¼. \quad (11)$$

MI1 210 then outputs the interpolated image $I_{i1}$, the local pixel number NbFB, the local pixel-based SF, and the local pixel-based SB to MI2 206, which performs halo reduction and a second image interpolation.

Figure 8:
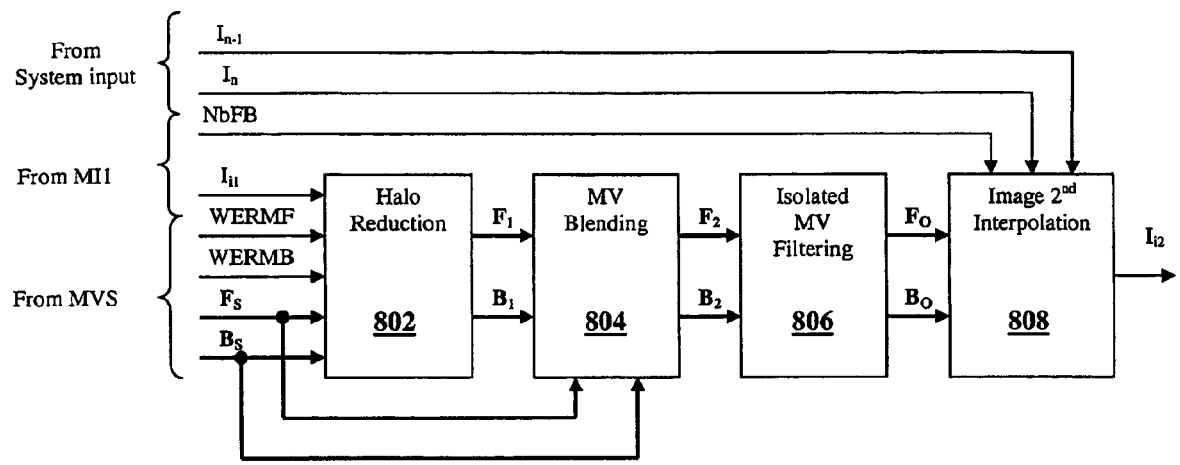
FIG. 8 illustrates a second motion interpolator as shown in FIG. 2 for halo reduction.

Second Motion Interpolator (MI2) 206 utilizes the results produced by MI1 204 as well as those produced by MVS 204 with shape-adaptive windowing in α-plane 102 for a second interpolation of the α-plane 102. FIG. 8 illustrates an embodiment of MI2 206 consistent with the present invention. As shown in FIG. 8, in some embodiments, MI2 206 includes a Halo reduction block 802, a MV blending block 804, an isolated MV filtering block 806, and an image second interpolation block 808.

In some embodiments, Halo reduction 802 uses a local sliding window through the first interpolated image $I_{i1}$ and the MV field $F_s$ and $B_s$ in α-plane 102 to filter the MV and thereby generate the α-plane image 102. Explicit detection of covering regions 304 or uncovering regions 308 need not be utilized. The local sliding window consists of a block of I×J pixels and sweeps across and down α-plane 102, one pixel at a time.

Figure 5A:
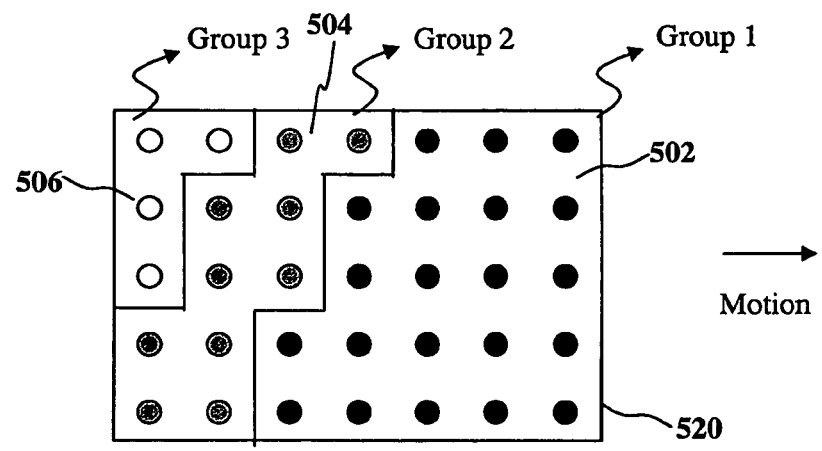
FIG. 5A illustrates a sliding and three-region segmented window centered in the foreground region.
Figure 5B:
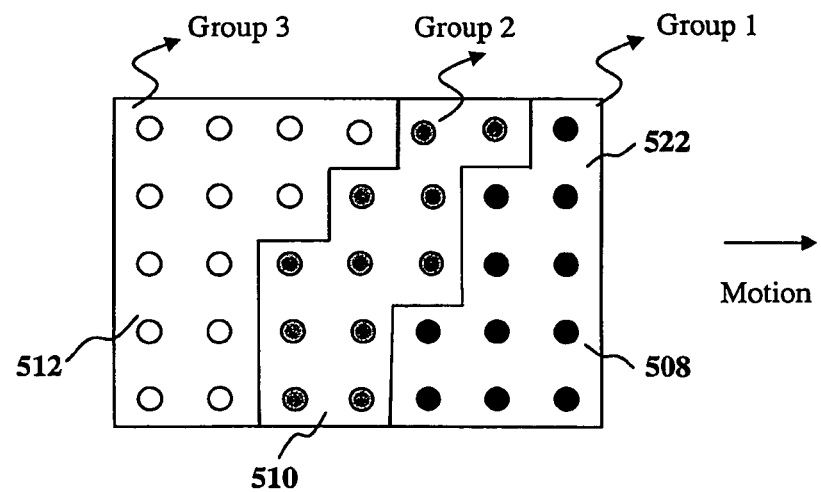
FIG. 5B illustrates a sliding and three-region segmented window centered in the occlusion region.

There are two binary segmentations based on intensity (luma) and MV uniformities in the local sliding window, as illustrated in FIGS. 5A and 5B. Adjustment of a motion vector MV, which is either $F_s$ and $B_s$, is described below. The operation described below for MV correction can be applied independently and in parallel for the two selected forward and backward MV $F_s$ and $B_s$ received from MVS 204.

Figure 4A:
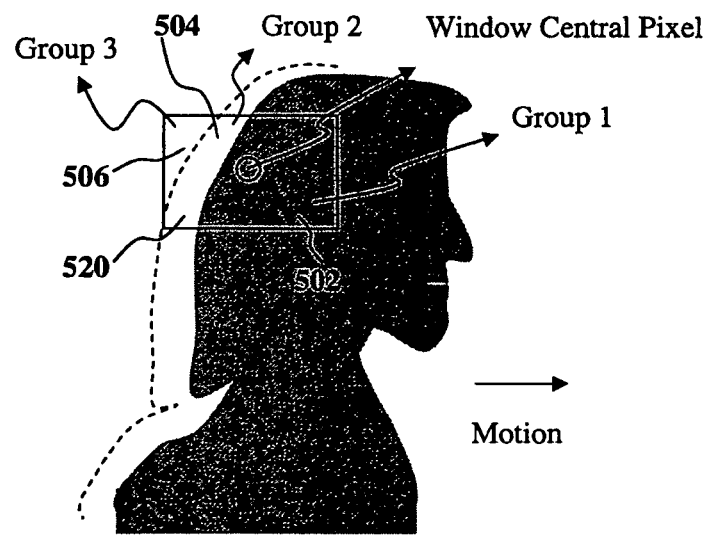
FIG. 4A illustrates a moving object and a sliding window centered in a foreground region.
Figure 4B:
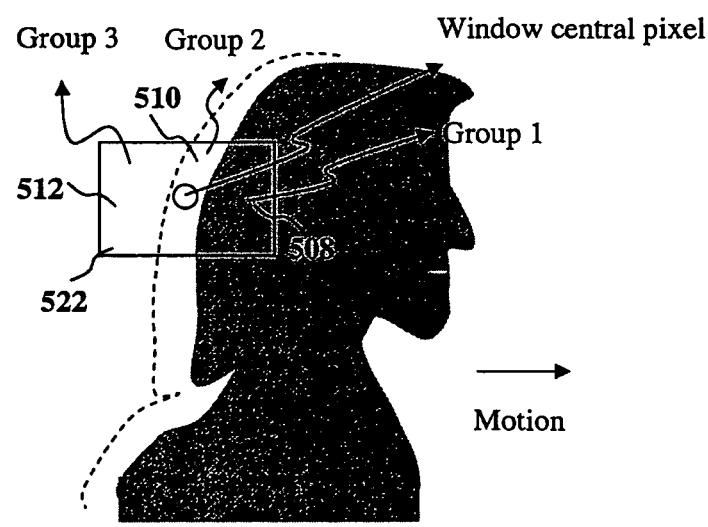
FIG. 4B illustrates a moving object and a sliding window centered in an occlusion region.

FIGS. 5A and 5B illustrate windows 520 and 522, respectively. Window 520 shown in FIG. 5A, where the central pixel is not in a Halo region, is also illustrated in FIG. 4A. Window 522 shown in FIG. 5B, where the central pixel is in a Halo region, is illustrated in FIG. 4B.

According to the first binary segmentation, the window, based on $I_{i1}$, is divided into two regions based on the luma level of each pixel relative to that of the central pixel in the window. All pixels with similar luma levels to the central pixel fall into one segment whereas pixels with different luma levels than that of the central pixel fall into the other segment. The second binary segmentation in the window is based on the MV values for each pixel relative to that of the central pixel in the window. All pixels with similar MV values to that of the central pixel in the window fall into one segment, whereas pixels with different MV values than that of the central pixel fall into the other segment.

In combining these two binary segmentations, pixels in a window 520 about a central pixel fall into three groups of interest: group 1 502, group 2 504, and group 3 506. Group 1 502 consists of a local group of pixels with small weighted local error WERM=WERMF/WERMB and similar luma levels and similar MV values to that of the central pixel as illustrated by FIG. 5A. Group 2 504 consists of a local group of pixels with large WERM and different luma level but similar MV values than that of the central pixel. Group 3 506 consists of a local group of pixels with small WERM and different luma levels and different MV values than that of the central pixel. Group 2 504 could be used as indication of a halo region. In some embodiments, only group 1 502 and group 2 504 are utilized. Group 1 502 can be utilized for MV smoothing. Group 2 504 can be utilized for Halo reduction.

In FIG. 5B, the central or considered pixel of a window 522 is now in a suspected halo region, i.e. a pixel within group 2 504 of window 520. These two binary segmentations divide the window into three groups of interest: Group 1 508, group 2 510, and group 3 512. Group 1 508 consists of a local group of pixels with small WERM and similar MV value but different luma level to the central pixel of window 522. Group 2 510 consists of a local group of pixels with large WERM and similar luma levels and similar MV values to that of the central pixel of FIG. 5B. Group 3 512 consists of a local group of pixels with small WERM and different MV values but with similar luma levels to that of the central pixel of window 522. Group 2 510 could be used again as indication of a halo region. In some embodiments presented herein, only the last two groups, group 2 510 and group 3 512, are used for halo reduction. Once a halo region is confirmed, the corrected motion vector for the central pixel is based on motion vectors of group 3 512 for true halo reduction. For the smoothness purpose in MV field, the MV in each group of window 522 can be re-estimated using the local mean.

Although the dimensions of windows 520 and 522 can be of any size, in some embodiments, the dimensions of window 522, I by J, may be large enough to sufficiently obtain pixels representing each of the groups when the current pixel is located in a suspected halo region. Moreover, I and J may be small enough to avoid wrong information which can falsify the MV estimation. In some embodiments, if ME 202 utilizes a block-based approach with a block having m×n pixels, window 522 can have a (horizontal) length J chosen between n and 2.5n pixels and can have a window height I, for economical purpose, that is chosen between 0.5 m to m.

In some embodiments, the MV in a given group of window 522 will be corrected if the MV estimation error WERM at the current pixel is larger than a threshold value and, in window 522, the number $N_{DE}$ of pixels with small estimation error and different MV values to that of the central pixel is large enough. In this case, the corrected MV will be the mean of these different motion vectors that already yield small errors. Thus, as illustrated by FIG. 4B, the MV in group 2 510 will be substituted by the mean value of motion vectors of group 3 512. In FIG. 4A, the MV in group 1 502 will not be corrected.

If the above condition is not true, i.e. the MV estimation error is relatively big or $N_{DE}$ is not important, the MV correction can be based on the cardinal numbers of the different groups. Let $N_R$ be the number of pixels that resemble the central considered pixel for similar intensity and similar MV. Let $N_D$ be the number of pixels of similar intensity but different MV values to that of the central pixel. Let $N_{RD}$ be the number of pixels with similar intensities as the central pixel in the window. As a result, $N_{RD}$ is equal to the sum of $N_R$ and $N_D$. $N_{RD}$ is smaller than the window size. As such, $N_{RD}$ is a relative number whereas the window size I*J is an absolute number indicating the size of the sliding window, windows 520 and 522.

Figure 6:
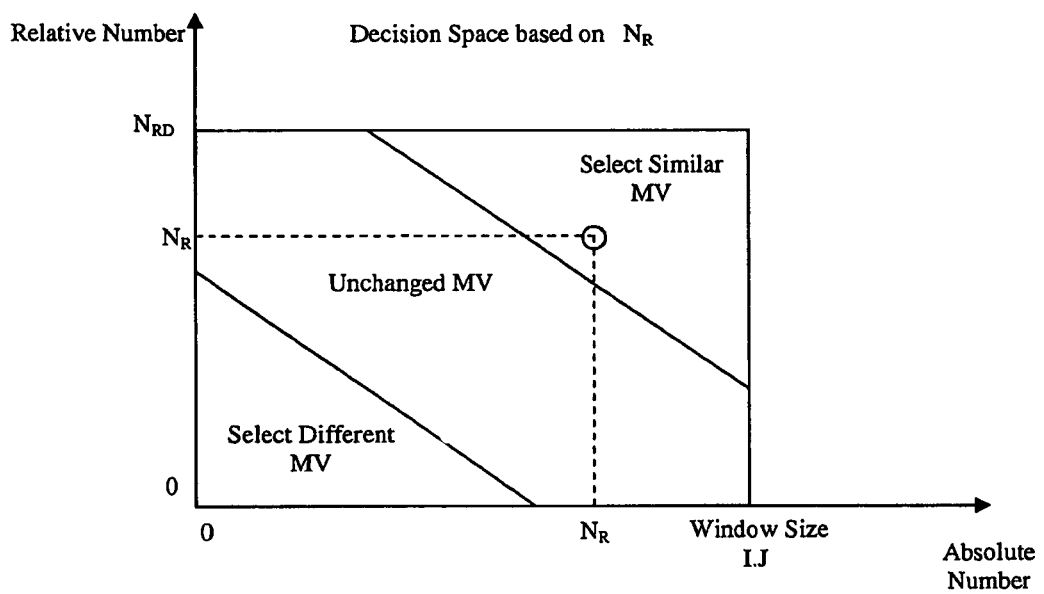
FIG. 6 illustrates a possible decision for MV correction.

FIG. 6 illustrates MV selection or correction. As shown in FIG. 6, in some embodiments MV selection or correction is a three-level decision in a two dimensional space based on the parameter $N_R$. The horizontal axis in FIG. 6 is the absolute number, whose maximum is the window size I*J. The vertical axis is the relative number whose maximum is $N_{RD}$. If $N_R$ is again the number of pixels of similar intensity and similar MV to that of the current central pixel, the selected MV can be one or none of two different estimated MV as shown in FIG. 6. In the upper right corner where $N_R$ is relatively equal to both cardinal numbers, the central pixel is assigned the mean of these same or similar motion vectors, which means that the mean of MV of group 1 502 in FIG. 4A or FIG. 5A. In the lower left corner, where $N_R$ is relatively small in comparison with the two cardinal numbers, the central pixel is assigned the mean of these different motion vectors, which is the MV of group 3 512 in FIG. 4B or FIG. 5B. In the case when none of these criteria is met, no MV of the above groups is selected and the original MV produced in MI1 210 is reused. Therefore, contrary to the prior art, the MV correction process utilized in some embodiments of the present invention do not require explicit detection of Covering/Uncovering regions.

In some embodiments, segmentation of the pixels in the local sliding window can be based on chroma levels. This gives additional confidence to the luma level segmentation described above with respect to FIGS. 5A and 5B. The grouping of pixels in these embodiments may, for example, use luma and chroma difference on the one hand and motion vectors on the other hand.

It should be obvious to those skilled in the art that the segmentations of luma and chroma as well as motion vectors in a local sliding window, as discussed above and illustrated in FIGS. 4A, 4B, 5A, and 5B are examples. In addition, the use of two cardinal numbers to partition the square illustrated in FIG. 6 is also exemplary. One could envision alternative selection and other cardinal numbers without departing from the scope of disclosed embodiments.

The corrected motion vectors $F_1$ and $B_1$, which correspond to the corrected $F_s$ and corrected $B_s$, respectively, produced by Halo reduction 802, for example according to the above decision rules, are input to MV blending 804. In order to avoid the spiky effect of any hard decision, the MV $F_1$ is blended with the selected MV $F_s$ of MVS 204 in a function of pixel-based forward estimation error (ef) of WERMF to provide MV output $F_2$. $F_2$ is then given by $$F_2 = F_s + (F_1 - F_s)(ef). \quad (12)$$

In a similar manner, $B_2$, the blended version of $B_1$ is given by:

$$B_2 = B_s + (B_1 - B_s)(eb). \quad (13)$$

where (eb) is the current pixel-based backward estimation error of WERMB.

The output from MV blending 804, F2 and B2, is input to Isolated MV Filtering 806. The obtained MV $F_2$ is then substituted by its PxQ neighbor median MV if the $F_2$ at the current pixel is relatively isolated. Precisely, the current MV output $F_o$ can be written as follows:

If, in the window of size PxQ, the number of MVs similar to that of the current central pixel is smaller than a threshold value, then $$F_o = \text{median vector}(F_{2;\,i,j}|(i,j) \in \text{Window}) \quad (14)$$

If not, $F_o = F_{2;\,0,0}|(0,0)$ is the window central pixel indice. (15).

$B_o$, the median filtered version of $B_2$, can be obtained in similar fashion. The values $F_o$ and $B_o$ output from isolated MV filtering 806 is input to image $2^{nd}$ interpolation 808.

In Image $2^{nd}$ Interpolation 808, the above obtained motion vectors, $F_o$ and $B_o$, are utilized in an interpolation. The $2^{nd}$ interpolation is similar to the $1^{st}$ interpolation MI1 210, and may use one of the following interpolations:

$$I_{i2}(x) = EB \cdot I_n(x + \alpha F_o) + EF \cdot I_{n-1}(x + \beta B_o) \quad (16)$$

or $$I_{i2}(x) = EB \cdot I_{n-1}(x - (1-\alpha)F_o) + EF \cdot I_{n-1}(x + (1-\alpha)B_o), \text{ if } 1 > \alpha \geq 3/4;$$

$$I_{i2}(x) = EB \cdot I_n(x + \alpha F_o) + EF \cdot I_n(x - \alpha B_o), \text{ if } 1/4 \geq \alpha > 0;$$

$$I_{i2}(x) = EB \cdot I_n(x + \alpha F_o) + EF \cdot I_{n-1}(x + (1-\alpha)B_O), \text{ if } 3/4 > 0 > 1/4. \quad (17)$$

When small motion judder is tolerable in a multi-frame interpolation, the following interpolation can be considered instead of the interpolation of Eqs. 16 or 17. This interpolation may increase the picture sharpness and result in more halo reduction. In this interpolation, the alpha value $\alpha$ is modified non-linearly by $\alpha'$ as follows (quadratic modification for example):

If $0 \leq \alpha \leq 1/2$ then $\alpha' = 2\alpha^2$. If $1/2 < \alpha < 1$ then $\alpha' = 1 - 2(1-\alpha)^2$ $$I_{i2}(x) = EB \cdot I_n(x - (1-\alpha')F_O) + EF \cdot I_{n-1}(x + (1-\alpha')B_O), \text{ if } 1 > \alpha > 3/4;$$

$$I_{i2}(x) = EB \cdot I_n(x + \alpha' F_O) + EF \cdot I_N(x - \alpha' B_O), \text{ if } 1/4 \geq \alpha > 0;$$

$$I_{i2}(x) = EB \cdot I_n(x + \alpha' F_o) + EF \cdot I_{n-1}(x + (1-\alpha'), \text{ if } 3/4 > 0 > 1/4. \quad (18)$$

The output from MI2 206, as shown in FIG. 2, is the interpolated alpha-plane image 102, $I_{i2}$, along with forward and backward motion vectors $F_0$ and $B_0$. Post Processor (PP) 208 receives the image data E2 and the motion vectors $F_0$ and $B_0$ and may reduce again some remaining halo in the presence of a lattice background and may also reduce flickering effects caused by isolated erroneous interpolated pixels in the occlusion regions or resulting from isolated MVs.

Figure 9:
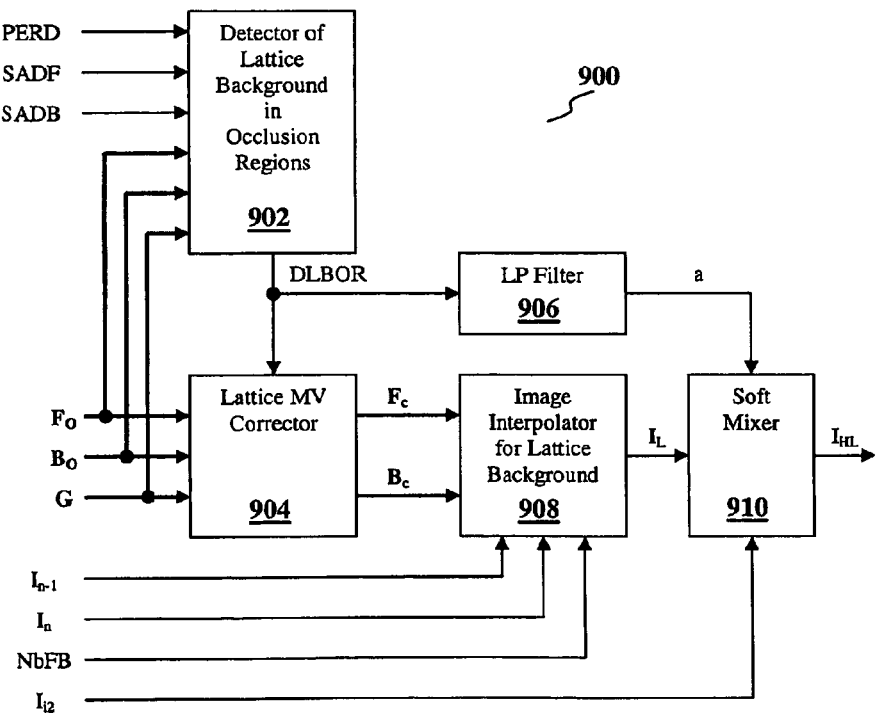
FIG. 9 illustrates further processing for halo reduction in background lattice post processing.

FIG. 9 illustrates a Halo reducer 900, which is part of post processor 208, for use with a lattice in the background. When a lattice is present in the background, small MV errors in occlusion regions can break the lattice structure in the interpolated image and the effect will be objectionable. As shown in FIG. 9, halo reducer 900 can include a Detector of Lattice Background in Occlusion Regions 902, a Lattice MV Corrector 904, an Image Interpolator for Lattice background 908, and a Soft Mixer 910.

The Occlusion Regions Detection in detector 902 can be based on whether or not SADF or SADB is greater than a threshold value. Moreover, in the occlusion regions, the forward and backward motion vectors are generally not aligned, i.e. the absolute of the sum $(F_o + B_o)$ is larger than a threshold value. It is worthwhile to note that detector 902 detects occlusion regions, but does not need to detect separate covering or uncovering areas. The lattice detection can be accomplished by block-based FFT analysis in ME 202. The binary signal PERD represents the periodic detection on/off result of a lattice. Furthermore, in order to correct the erroneous MV, a component-wise comparison can be performed between the vectors $F_o$ and G and $B_o$ and G, where the MV G is defined as a global MV estimated via suitable histogram analysis in ME 202. For example if the background is still or MV G is not available, G can be set equal to 0. The MV G can be also estimated by using a suitable sliding window locally segmented to three pixel groups as discussed above with respect to MI2 206. The detector binary signal output DLBOR activates the Lattice MV Corrector 904. DLBOR is applied also to the input of a Low Pass Filter 906 which yields in turn an analogue signal (a) which is input to soft mixer 910.

Lattice MV Corrector 904, when activated by detector signal DLBOR, substitutes $F_o$ and $B_o$ by G to produce motion vectors $F_c$ and $B_c$. Accordingly, $F_c$ and $B_c$ are the forward and backward motion vectors provided by MV corrector.

Image Interpolator for Lattice background 908, when the motion vectors $F_c$ and $B_c$ are available, can be described by the previous interpolation model of EQ. 16. The Image Interpolation result, $I_L$, can, then be defined as follows:

$$I_L(X) = EB \cdot I_n(x + \alpha F_c) + EF \cdot I_{n-1}(x + (1-\alpha)B_c). \quad (19)$$

In order to reduce the detection boundary effect, soft mixer 910 is utilized to provide an image output $I_H$ for the halo-lattice correction:

$$I_{HL}(X) = I_{i2}(x) + [I_L(X) - I_{i2}(x)](a). \quad (20)$$

The image output $I_{HL}$ can then be applied to a Flicker Reducer for the final correction.

Figure 10:
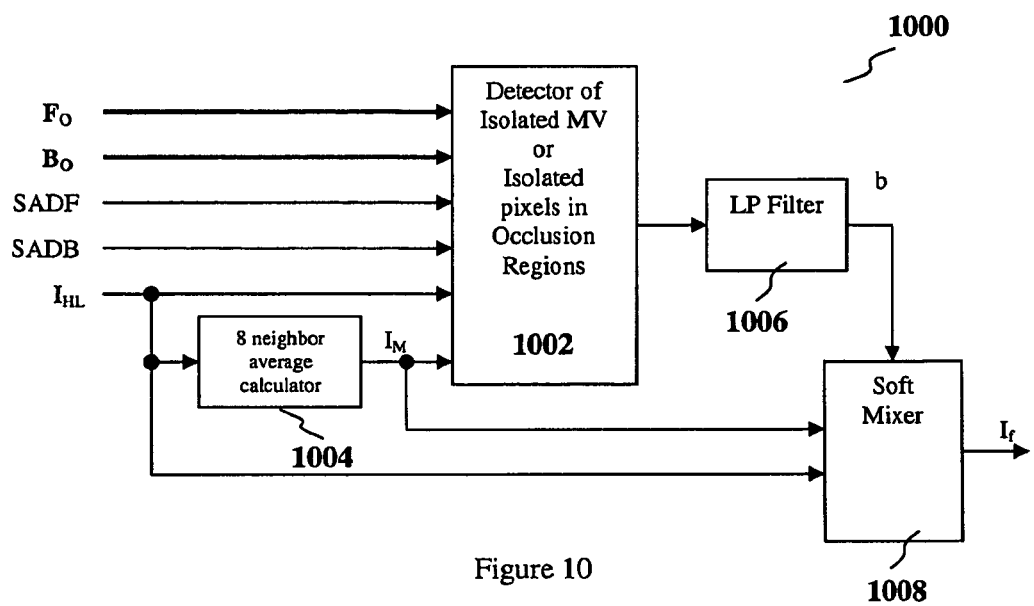
FIG. 10 illustrates processing for flicker reduction that can be performed in post processing.

FIG. 10 illustrates a Flicker Reducer 1000, which is part of post processor 208. Flicker reducer 1000 can be the final stage of post processor 208 shown in FIG. 2. As shown in FIG. 10, flicker reducer 1000 can include a flicker detector 1002, a neighbor average calculator 1004, and a soft mixer 1008.

Flicker detector 1002 detects possible flickering effect, which is due primarily to isolated erroneous interpolated pixels in occlusion regions or to isolated MVs. Occlusion regions detection previously described is based on SADF, SADB, the sum of forward and backward motion vectors, and the difference between the current intensity and its neighbor (for example eight-neighbor) average value. The isolated MV detection is based on, in a small widow, the number of pixels with the different MV from the current one. The difference is considered for each horizontal or vertical component of forward and backward MV $F_o$ and $B_o$. The binary signal output of the detector is applied to a Low Pass Filter 1006, which yields in turn an analogue signal (b) for further mixing purposes. Average Calculator 1004 provides at its output an intensity average value $I_M$ of neighboring pixels (for example eight neighboring pixels) to the current pixel.

Soft Mixer 1008 provides the final image $I_f$ according to the following relation:

$$I_f(X) = I_{HL}(X) + [I_M(X) - I_{HL}(x)](b). \qquad (21)$$

The image $I_f(x)$, then, represents the image in the alpha plane 102 shown in FIG. 1.

Figure 7:
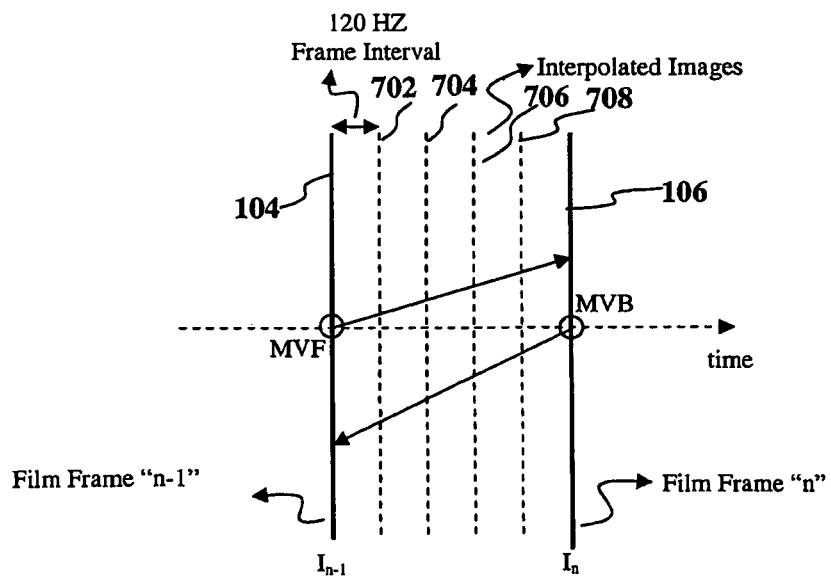
FIG. 7 illustrates interpolating multiple images between two existing consecutive images.

In some embodiments, interpolating more than one frame between existing frames is performed. For example, converting 24 fps film content to 120 HZ video requires interpolating four frames between any two original frames, as is illustrated by alpha-planes 702, 704, 706, and 708 in FIG. 7. Motion estimation (ME) in ME 202 is performed between the original two images 104 and 106, $I_n$ and $I_{n-1}$, respectively, and it is therefore the same as the method described above. The MVF and MVB selection in this case is the same as the example of the single frame interpolation given above. Accordingly, motion vector selection (MVS) 204 performs similarly to that described above. For each interpolated plane, a similar MVS can be used in a suitable combination of parallel and/or series as a function of available calculation power. The first motion interpolation MI1 210 can be accomplished similarly by estimating pixel values at different time intersection of the motion vectors. The second motion interpolation performed in MI2 is also similar for each alpha plane. Finally, for high frame rate output, MVS 204, MI1 210, MI2 206, and PP 208 can be performed in a suitable combination of parallel and/or series processing as a function of available calculation power.

Embodiments of the application can be implemented on any machine capable of processing image data. For example, embodiments can be implemented on a processor executing software code that implements the functions discussed here. Such software can be stored on any computer medium, including, for example, hard drives, memory, removable drives. Additionally, embodiments can be implemented on a dedicated ASIC with a processor and memory.

Some embodiments of the present invention can significantly reduce the appearance of halo, flickering and block artifact in interpolated images for real-time applications. It should be obvious to those skilled in the art that this selection of MV and the corresponding interpolation of the intermediate α-plane are exemplary and other multi-level decisions could be made or different groups may be considered differently to select/correct MV and generate an intermediate image without departing from the scope of the embodiments given herein. It should be appreciated by those skilled in the art that certain steps or components could be altered without departing from the scope of the embodiments presented herein. As such, the present invention should be limited only by the following claims.

We claim:

1. A method for interpolating an image between first and second adjacent images, comprising:
    estimating a block-based forward motion vector and a block-based backward motion vector between the first and second adjacent images;
    selecting a forward motion vector for each pixel in the image based on the block-based forward motion vector and a forward error function;
    selecting a backward motion vector for each pixel in the image based on the block-based backward motion vector and a backward error function;
    interpolating a first image from the selected backward motion vectors, the selected forward motion vectors, a block-based forward estimation error, and a block-based backward estimation error;
    interpolating a second image from the first image based on forward and backward weighted errors of the selected forward motion vector and the selected backward motion vector, and wherein the first image and the second image comprise pixel data, the pixel data comprising chrominance and/or luminance data, wherein interpolating the second image comprises reducing a halo effect, and reducing the halo effect includes:
        segmenting from local intensity information in a plane of the image, the selected forward motion vector, a corresponding local weighted forward minimum error, and a local sliding segmented window having a plurality of pixel groups of interest for forward motion vectors;
        segmenting from local intensity information in the plane of the image, the selected backward motion vector, a corresponding local weighted backward minimum error, and a local sliding segmented window having a plurality of pixel groups of interest for backward motion vectors; and
    determining the image from the second image.

2. The method of claim 1, wherein estimating the block-based forward estimation error and estimating the block-based backward estimation error includes calculating a forward sum of absolute differences error and a backward sum of absolute differences error.

3. The method of claim 1, wherein estimating the block-based forward motion vector and the block-based backward motion vector is adaptive.

4. The method of claim 1, wherein estimating the block-based forward motion vector and the block-based backward motion vector is performed on interlaced images.

5. The method of claim 1, wherein selecting the forward motion vector or selecting the backward motion vector includes converting block-based motion vectors to pixel based motion vectors of the image.

6. The method of claim 1, wherein the forward error function and the backward error function is the sum of the differences between motion vectors in the image estimated from the first and second adjacent images.

7. The method of claim 1, wherein the forward error function and the backward error function is a composite local error.

8. The method of claim 1, wherein the forward error function and the backward error function is a weighted local error.

9. The method of claim 1, wherein interpolating the first image includes
    calculating a number of pixels based on pixel based values of block error functions and a location a of the image relative to the first and second adjacent planes;
    calculating the first image based on the selected forward motion vector, the selected backward motion vector, a normalized number of pixels based on the number of pixels, and the location α.

10. The method of claim 9, wherein interpolating the first image is a context based interpolation.

11. The method of claim 9, wherein interpolating the first image includes a function of temporal distance.

12. The method of claim 1, wherein interpolating the second image further includes
    blending motion vectors;
    filtering motion vectors; and
    image interpolating.

13. The method of claim 12, wherein reducing the halo effect further includes
    correcting the selected forward motion vector based on the current position of one of the plurality of pixel groups of interest for providing a corrected forward motion vector that reduces a halo effect; and correcting the selected backward motion vector based on the current position of one of the plurality of pixel groups of interest for providing a corrected backward motion vector that reduces a halo effect.

14. The method of claim 13, wherein blending motion vectors includes calculating an adjusted forward motion vector by adding a forward estimated error times a difference between the corrected forward motion vector and the selected forward motion vector to the selected forward motion vector.

15. The method of claim 14, wherein blending motion vectors further includes calculating an adjusted backward motion vector by adding a backward estimated error times a difference between the corrected backward motion vector and the selected backward motion vector to the selected backward motion vector.

16. The method of claim 15, wherein filtering motion vectors includes substituting the adjusted forward motion vector with a median forward motion vector and the adjusted backward motion vector with a median backward motion vector.

17. The method of claim 16, wherein image interpolating includes forming the second image from the adjusted forward motion vector and the adjusted backward motion vector.

18. The method of claim 17, wherein forming the second image includes interpolating with a quadratic modification of the temporal location of the image.

19. The method of claim 1, wherein determining the image includes post processing the second image by
reducing a halo effect; and
reducing a flicker effect.

20. The method of claim 19, wherein reducing the halo effect includes
detecting a lattice background;
correcting motion vectors;
interpolating a final image; and
mixing a correction into the final image.

21. The method of claim 20, wherein reducing the flicker effect includes
detecting flicker;
determining neighborhood average; and
mixing the neighborhood average with the final image to form the image.

22. An image interpolator, comprising:
a block-based motion estimator coupled to receive adjacent images, the block-based motion estimator providing a block-based forward motion vector, a block-based backward motion vector, a forward error, and a backward error;
a motion vector select coupled to the block-based motion estimator, the motion vector select providing pixel based selected forward motion vector and selected backward motion vector, and providing pixel based forward and backward errors;
a first image interpolator coupled to the block-based motion estimator and the motion vector select, the first image interpolator providing a first interpolated image from the selected forward motion vector and the selected backward motion vector, the first interpolated image being interpolated at a temporal distance in between the adjacent images;
a second image interpolator coupled to the first image interpolator and the motion vector select, the second image interpolator providing a second interpolated image and corrected forward motion vectors and corrected backward motion vectors, the second interpolated image being based on the first interpolated image and being interpolated at the temporal distance, and wherein the first interpolated image and the second interpolated image comprise pixel data, the pixel data comprising chrominance and/or luminance data, the second image interpolator including:
a halo reducer that segments the selected forward motion vector, the selected backward motion vector, and corresponding local weighted forward and backward minimum errors from local intensity information in a plane of the image and utilizes a local sliding segmented window having a plurality of pixel groups of interest for forward and backward motion vectors to correct the selected forward motion vector and the selected backward motion vector; and
a post processing block coupled to the first image interpolator and the second image interpolator, the post processing block providing a final interpolated image from the second interpolated image and the corrected forward motion vectors and the corrected backward motion vectors, the final interpolated image being interpolated at the temporal distance.

23. The image interpolator of claim 22, wherein the second image interpolator further includes
a MV blending block that further corrects the selected forward motion vector and the selected backward motion vector;
an isolated MV filter that further corrects the selected forward motion vector and the selected backward motion vector to produce the corrected forward motion vector and the corrected backward motion vector; and
a second image interpolator that interpolates an image from the corrected forward motion vector and the corrected backward motion vector.

24. The image interpolator of claim 22, wherein the post processing block includes
a halo reducer; and
a flicker reducer.

25. The image interpolator of claim 24, wherein the halo reducer includes
a lattice background detector;
a lattice motion vector corrector coupled to the lattice background detector, the lattice motion vector corrector correcting the corrected forward motion vector and the corrected backward motion vector; and
an image interpolator that interpolates an image from motion vectors corrected by the lattice motion vector corrector.

26. The image interpolator of claim 24, wherein the flicker reducer includes
a isolated element detector, the isolated element detector detecting an isolated motion vector or an isolated pixel; and
a neighbor average calculator.

27. An image interpolator, comprising
a motion estimator that estimates block-based motion vectors between a first image and a second image;
a motion vector selector coupled to the motion estimator that provides selected motion vectors based on the block-based motion vectors and forward and backward error functions;
a first interpolator coupled to receive the selected motion vectors and provide a first interpolated image for a plane between the first image and the second image; and
a second interpolator coupled to receive the first interpolated image that corrects the selected motion vectors to form corrected motion vectors and provides a second interpolated image based on corrected motion vectors, and wherein the first interpolated image and the second interpolated image comprise pixel data, the pixel data comprising chrominance and/or luminance data, the second image interpolator including:

a halo reducer that segments the selected motion vectors and corresponding local weighted minimum errors from local intensity information in a plane of the image and utilizes a local sliding segmented window having a plurality of pixel groups of interest for forward and backward motion vectors to correct the selected motion vectors.

\* \* \* \* \*